L. M. Hart.
Pile for Railroad Rails.
Nº 60,723. Patented Jan. 1, 1867.
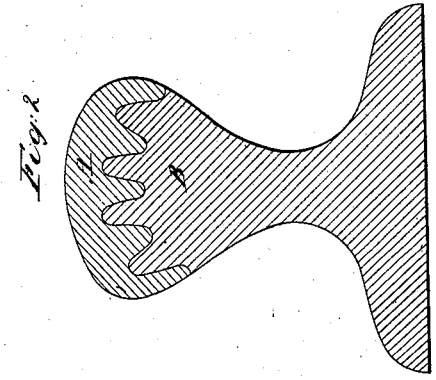
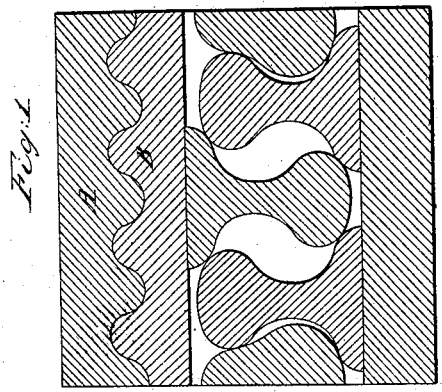
Witnesses
Inventor

United States Patent Office.

L. M. HART, OF PHILADELPHIA, PENNSYLVANIA.

Letters Patent No. 60,723, dated January 1, 1867.

IMPROVEMENT IN MAKING STEEL-HEADED RAILS.

*The Schedule referred to in these Letters Patent and making part of the same.*

TO ALL WHOM IT MAY CONCERN:

Be it known that I, L. M. HART, of Philadelphia, in the county of Philadelphia, and State of Pennsylvania, have invented a new and improved Steel-Headed Rail; and I do hereby declare that the following is a full, clear, and exact description thereof, which will enable others skilled in the art to make and use the same, reference being had to the accompanying drawings, forming part of this specification, in which—

Figure 1 represents a transverse section of the pile before rolling.

Figure 2 is a similar section of the rail when rolled.

Similar letters of reference indicate like parts.

This invention consists in rolling or otherwise producing grooves or roughnesses upon the surface of a plate or mass of steel, and subsequently welding such plate or mass on a plate, bar, or mass of iron, for the purpose of forming the head of a rail in such a manner that advantage is taken of the superior hardness of the steel, causing the same to penetrate the iron, and to produce a greater surface for the weld, and a sort of dove-tailing between the two metals; and thereby a steel-headed rail is produced, from which the head is less liable to separate than it does from steel-headed rails made in the ordinary way.

A represents a bar or mass of steel, which is made undulating or corrugated at its under surface, and is welded to a bar or mass, B, of iron. In welding the two masses together, the projections or undulations of the steel penetrate the iron, and thereby the welding surface is increased; and, furthermore, said two masses are caused to interlock with each other, thus producing a mechanical connection, in addition to the connection produced by the welding operation. The mass of iron and steel thus obtained may be then placed on the top of a pile, the steel side up, and the whole is heated and rolled in the ordinary manner, or the roughened steel slab may be welded directly upon the pile. The rails obtained by this operation show a cross-section somewhat like that shown in fig. 2 of the drawings, the steel head being firmly interlocked with and united to the iron, which, by the welding operation, is formed into one mass, and by these means a steel-headed rail is obtained from which the steel is not liable to separate.

I do not claim the use of a slab of steel to form that part of a pile of which is formed the head of a rail; nor do I claim the welding of a piece of steel upon a piece of iron, before it is placed in the pile, for the purpose of forming the head of a rail; but what I claim as new, and desire to secure by Letters Patent, is—

I claim a faggot for making a steel-capped railroad rail, composed of the corrugated steel bar A, and iron bar B, arranged and piled with the other parts, in the manner shown and described.

L. M. HART.

Witnesses:
CHAS. S. HINCHMAN,
ALEX. F. ROTLINGER.